(12) United States Patent
Yasuda

(10) Patent No.: US 10,466,682 B2
(45) Date of Patent: Nov. 5, 2019

(54) CONTROLLER

(71) Applicant: FANUC CORPORATION, Minamitsuru-gun, Yamanashi (JP)

(72) Inventor: Masashi Yasuda, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 16/014,754

(22) Filed: Jun. 21, 2018

(65) Prior Publication Data

US 2018/0373228 A1 Dec. 27, 2018

(30) Foreign Application Priority Data

Jun. 27, 2017 (JP) ................................ 2017-125522

(51) Int. Cl.
*G05B 19/414* (2006.01)

(52) U.S. Cl.
CPC .................... *G05B 19/4141* (2013.01); *G05B 2219/34015* (2013.01); *G05B 2219/41002* (2013.01); *G05B 2219/41015* (2013.01); *G05B 2219/49384* (2013.01)

(58) Field of Classification Search
CPC ................................................ G05B 19/4141
USPC ................................................ 318/567, 560
See application file for complete search history.

(56) References Cited

U.S. PATENT DOCUMENTS

| 8,610,393 B2 * | 12/2013 | Barkman ............. G05B 19/401 318/561 |
| 2011/0287693 A1 | 11/2011 | Hosokawa et al. |
| 2017/0075337 A1 | 3/2017 | Kameta et al. |

FOREIGN PATENT DOCUMENTS

| JP | 6030580 A | 2/1985 |
| JP | 09-160619 A | 6/1997 |
| JP | 2002144101 A | 5/2002 |
| JP | 2002-182714 A | 6/2002 |
| JP | 2011-248473 A | 12/2011 |
| JP | 2017-56515 A | 3/2017 |
| WO | 2016148116 A1 | 9/2016 |

OTHER PUBLICATIONS

Decision to Grant a Patent for Japanese Application No. 2017-125522, dated Oct. 24, 2018 with translation, 6 pages.

* cited by examiner

*Primary Examiner* — David Luo
(74) *Attorney, Agent, or Firm* — RatnerPrestia

(57) ABSTRACT

A controller performs high-accuracy oscillation control in which an axis driven by a motor is rocked in accordance with the rotation of a spindle motor for driving a main spindle. This controller determines a reference speed of rocking motion based on a reference speed set in advance, a reference main spindle rotational speed of the spindle motor, and an actual main spindle rotational speed, and calculates a rocking motion speed for each control period based on the determined reference speed of the rocking motion. The calculated rocking motion speed for each control period is added to a command outputted by the controller for controlling the position of the motor for each control period.

1 Claim, 5 Drawing Sheets

FIG. 3
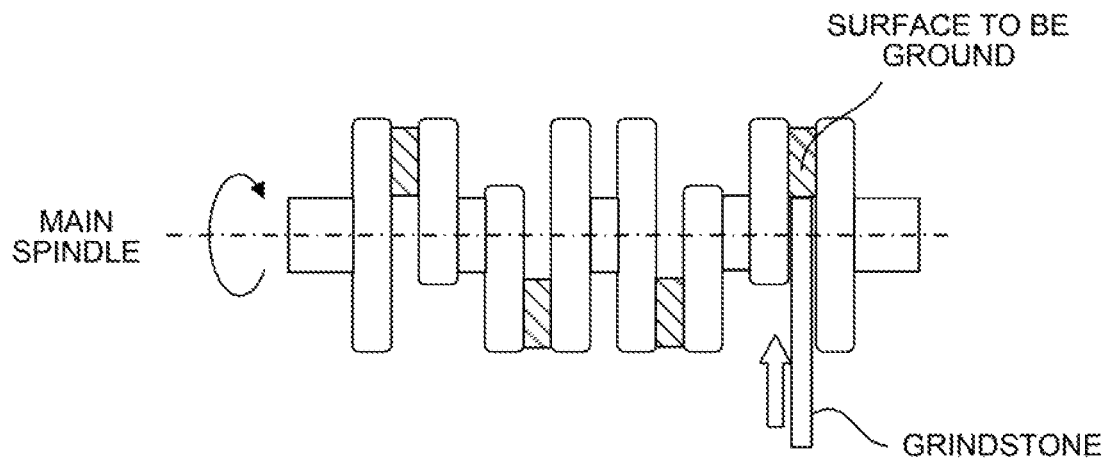
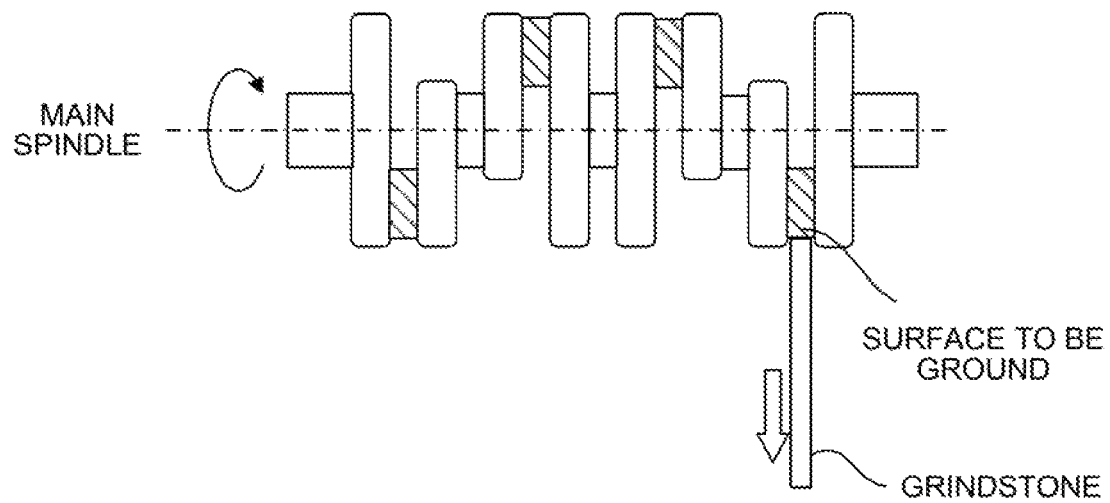

FIG. 6
- ROTATIONAL SPEED OF MAIN SPINDLE: LOW
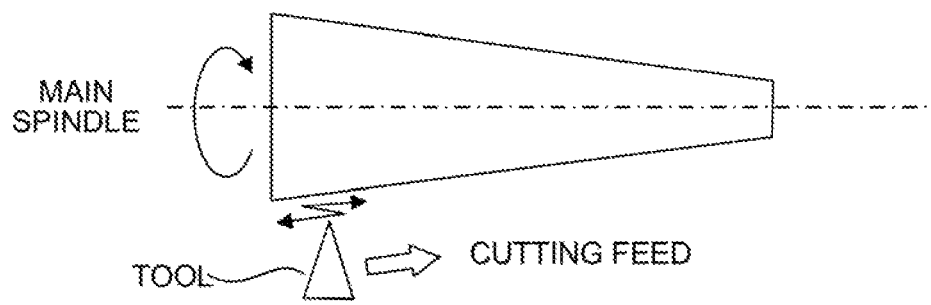
PERIOD OF OSCILLATION: CONSTANT
- ROTATIONAL SPEED OF MAIN SPINDLE: HIGH
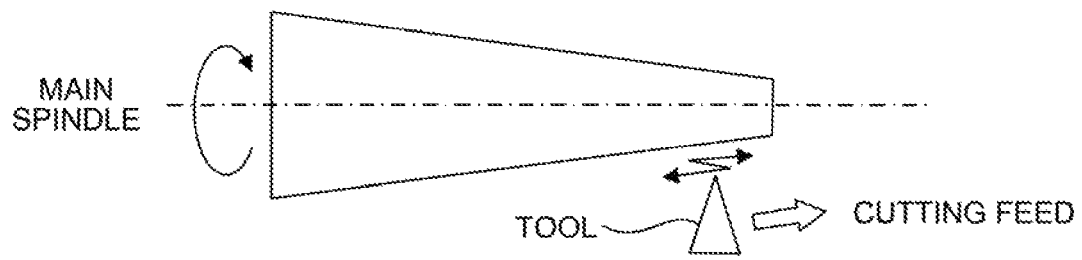
PERIOD OF OSCILLATION: CONSTANT

CONTROLLER

CROSS-REFERENCE TO RELATED APPLICATION

This application is a new U.S. Patent Application that claims benefit of Japanese Patent Application No. 2017-125522, filed Jun. 27, 2017, the disclosure of this application is being incorporated herein by reference in its entirety for all purposes.

BACKGROUND OF THE INVENTION

1. Field of the Invention

The present invention relates to a controller, and particularly to a controller having a rocking motion function according to the rotational speed of a main spindle.

2. Description of the Related Art

High-accuracy oscillation control that sinusoidally rocks an axis in a freely-selected region is one of axis control methods (for example, Japanese Patent Application Laid-Open No. 2011-248473 and the like). In one example of such high-accuracy oscillation control, a Z axis is rocked with the same period and in the same phase as a main spindle in accordance with the rotation of the main spindle that turns from phase θ=0 at time t=0. In this example, an end point that is an upper rocking region boundary of the rocking motion of the Z axis is referred to as a top dead point $Z_U$, an end point that is a lower rocking region boundary thereof is referred to as a bottom dead point $Z_L$, and the maximum speed of the Z axis between the top dead point $Z_U$ and the bottom dead point $Z_L$ is referred to as a reference speed $F_B$. The travel speed of the Z axis at a predetermined time t is controlled to be the speed represented by the following formula (1). Thus, the rocking motion of the Z axis according to the rotation of the main spindle can be realized. In high-accuracy oscillation control, parameters such as the top dead point $Z_U$, the bottom dead point $Z_L$, and the reference speed $F_B$ described above are set in accordance with the purpose by a user.

$$\frac{\partial Z}{\partial t} = F_B \sin\left(\frac{2F_B}{|Z_U - Z_L|} t\right) \quad (1)$$

Examples of machining using high-accuracy oscillation control include the grinding of a crankshaft using a grinding wheel (FIG. 3) as disclosed in Japanese Patent Application Laid-Open Nos. 09-160619 and 2002-182714. In such a machining method, for example, when a journal of a crankshaft is rotated as a rotary axis to grind a pin portion or the like, a grinding head needs to be moved forward and backward with respect to a workpiece in accordance with the rotational speed of the main spindle specified by a machining program or the like to perform grinding. To control the motion of the grinding head, high-accuracy oscillation control is used.

In another example of machining using high-accuracy oscillation control, a tool is moved while being rocked to subdivide chips (FIG. 4) as disclosed in Japanese Patent Application Laid-Open No. 2017-056515. In such a machining method, a rocking command that specifies rocking motion at a rocking frequency according to the rotational speed of the main spindle specified by a machining program or the like is created, and the tool is moved at a rate obtained by adding the rocking command to the cutting feed speed of the tool.

In high-accuracy oscillation control, the period of oscillation needs to be set and determined by a user as described above. Accordingly, in the case where the period of oscillation is changed, the user needs to set parameters again. However, in oscillation motion according to the rotation of the main spindle in which the period of rotation of the main spindle is not constant, a synchronization error in high-accuracy oscillation control is generated, and this may lead to unsuccessful machining.

For example, in the grinding of a crankshaft such as shown in FIG. 3, machining is performed with the period of oscillation being set so that a grindstone and a surface to be ground may be always in contact with each other. When an instantaneous change occurs in the rotational speed of a main spindle due to a disturbance or the like, a shift in phase between the position of the grindstone and the position of the surface to be ground occurs as shown in FIG. 5 and may cause an impact between the grindstone and the surface to be ground.

Moreover, in the case where chips are subdivided by oscillation as shown in FIG. 4, the period of oscillation needs to be set in accordance with the rotational speed of the main spindle. Accordingly, for example, even when a conical workpiece is machined by a turning process, the rotational speed of the main spindle has to be constant. However, in the case where a conical workpiece is machined by a turning process with the rotational speed of the main spindle kept constant, the relative speed between the workpiece and the tool along the circumference of the workpiece is different between when the tool is at a position on the workpiece where the outside diameter thereof is large and when the tool is at a position on the workpiece where the outside diameter thereof is small. This causes a problem that the quality of a machined surface of the workpiece cannot be kept constant. To cope with this, the circumferential speed of the workpiece can be controlled at a constant value (that is, controlled so that the relative speed between the tool and the workpiece along the circumference of the workpiece may be substantially constant) as shown in FIG. 6 so that the quality of a machined surface of the workpiece may be kept constant. In that case, the rotational speed of the main spindle changes in accordance with the position of the tool with respect to the workpiece. However, as described above, the period of oscillation is kept at a constant value set by the user. Accordingly, the subdividing of chips fails in some areas.

SUMMARY OF THE INVENTION

Accordingly, an object of the present invention is to provide a controller that can deal with a change in the rotational speed of a main spindle in machining using high-accuracy oscillation control.

The present invention solves the above-described problems by providing a controller with a function that generates an oscillation command in which a reference speed is changed based on an actual rotational speed of a main spindle so that a change in the period of rotation of a main spindle can be dealt with in high-accuracy oscillation control.

A controller according to the present invention is a controller that performs high-accuracy oscillation control in which an axis driven by a motor is rocked in accordance with rotation of a spindle motor for driving a main spindle. The controller includes: a position command section configured to output a command for controlling a position of the motor for each control period; an oscillation reference speed determination section configured to determine a reference speed of the rocking motion based on a reference speed set as a parameter in advance, a reference main spindle rotational speed of the spindle motor, and an actual main spindle rotational speed of the spindle motor fed back from the spindle motor; an oscillation command calculation section configured to calculate a rocking motion speed for each control period based on a rocking-motion-related set value set in advance and the reference speed of the rocking motion determined by the oscillation reference speed determination section; and an adder configured to add the rocking motion speed for each control period calculated by the oscillation command calculation section to the command outputted by the position command section for controlling position.

In the present invention, in the case where the rotational speed of a main spindle changes when high-accuracy oscillation control is being performed, a reference speed of an oscillation command changes in accordance with the rotational speed of the main spindle. Accordingly, machining without a shift in the period of oscillation or phase with respect to the rotational speed of the main spindle can be performed.

BRIEF DESCRIPTION OF THE DRAWINGS

FIG. 3 is a view for explaining the grinding of a crankshaft according to a prior art technique.

FIG. 6 is a view for explaining subdividing of chips according to a prior art technique.

DETAILED DESCRIPTION OF THE PREFERRED EMBODIMENT

Hereinafter, an example of a configuration of a controller for realizing the present invention will be described. However, the configuration of the controller of the present invention is not limited to the following example. Any configuration that can realize the object of the present invention may be employed.

Figure 1:
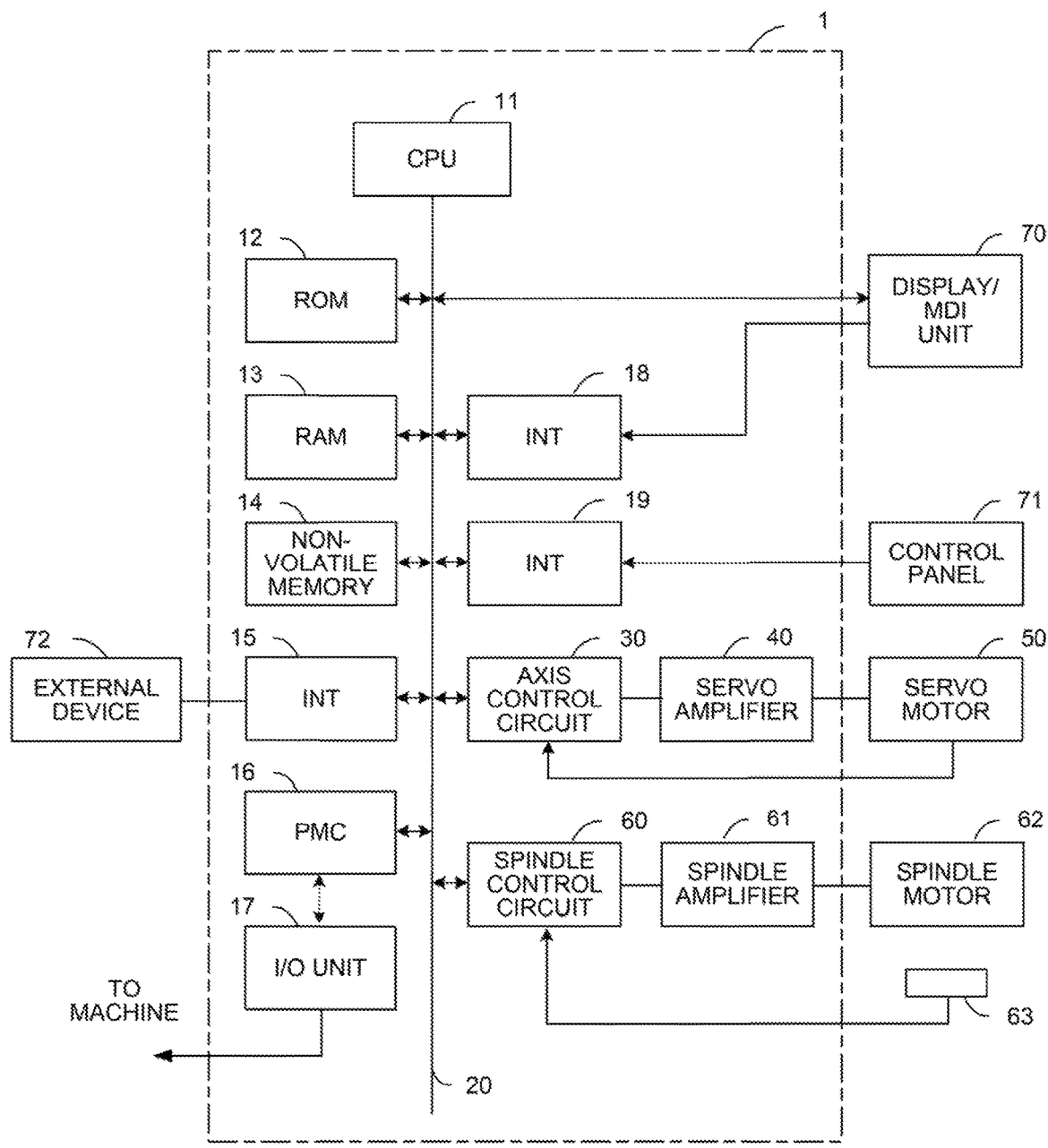
FIG. 1 is a schematic hardware configuration diagram showing a controller according to one embodiment and principal portions of a machining apparatus driven and controlled by the controller.

FIG. 1 is a schematic hardware configuration diagram showing a controller according to one embodiment and principal portions of a machining apparatus driven and controlled by the controller.

A controller 1 according to the present embodiment includes a CPU 11. The CPU 11 is a processor that wholly controls the controller 1. The CPU 11 reads a system program stored in a ROM 12 through a bus 20, and controls the entire controller 1 in accordance with the read system program. A RAM 13 stores data such as temporary calculation data or display data and various kinds of data inputted by an operator through a display/MDI unit 70, which will be described later.

A non-volatile memory 14 is configured as a memory that maintains the state of memory using, for example, a battery (not shown) for memory backup even when the power of the controller 1 is turned off. The non-volatile memory 14 stores a machining program read through an interface 15 and a machining program inputted through the display/MDI unit 70, which will be described later, and also stores data such as tool data including recommended values for cutting conditions for a tool to be used in machining. Further, the non-volatile memory 14 stores programs such as a machining-program operation processing program to be used to run a machining program. Such programs are loaded into the RAM 13 at the time of execution.

The ROM 12 has various system programs (including a system program for a rocking motion function) prewritten therein so that processing such as edit mode processing necessary for creating and editing a machining program can be executed.

The interface 15 is an interface for connecting the controller 1 and an external device 72 such as an adapter. Machining programs, various parameters, and the like are read from the external device 72 side. A machining program edited in the controller 1 can be stored in external storage means through the external device 72. A programmable machine controller (PMC) 16 outputs a signal to a peripheral device (for example, an actuator such as a tool change robot hand) of the machining apparatus through an I/O unit 17 and controls the peripheral device in accordance with a sequence program incorporated in the controller 1. Further, the PMC 16 receives signals from various switches and the like on a control panel disposed on the main body of the machining apparatus, and passes the signals to the CPU 11 after necessary signal processing is performed.

The display/MDI unit 70 is a manual data input device having a display, a keyboard, and the like, and an interface 18 receives commands and data from the keyboard of the display/MDI unit 70 and passes the commands and the data to the CPU 11. The interface 19 is connected to a control panel 71 having, for example, a manual pulse generator that is used to manually drive each axis.

An axis control circuit 30 for controlling an axis of the machining apparatus receives a commanded amount of travel for the axis from the CPU 11, and outputs a command for the axis to a servo amplifier 40. The servo amplifier 40 receives the command, and drives a servo motor 50 for moving the axis of the machining apparatus. The servo motor 50 of the axis incorporates a position and speed detector, and feeds a position and speed feedback signal received from the position and speed detector back to the axis control circuit 30 to perform position and speed feedback control. It should be noted that the hardware configuration diagram in FIG. 1 only shows one axis control circuit 30, one servo amplifier 40, and one servo motor 50, but actually the same numbers of axis control circuits 30, servo amplifiers 40, and servo motors 50 as the number of axes of the machining apparatus that are to be controlled are prepared.

A spindle control circuit 60 receives a main spindle rotation command to the machining apparatus, and outputs a spindle speed signal to a spindle amplifier 61. The spindle amplifier 61 receives the spindle speed signal, and turns a spindle motor 62 of the machining apparatus at the commanded rotational speed to drive the tool.

A position coder 63 is coupled to the spindle motor 62. The position coder 63 outputs a feedback pulse in synchronization with the rotation of the main spindle. The feedback pulse is read by the CPU 11.

Figure 2:
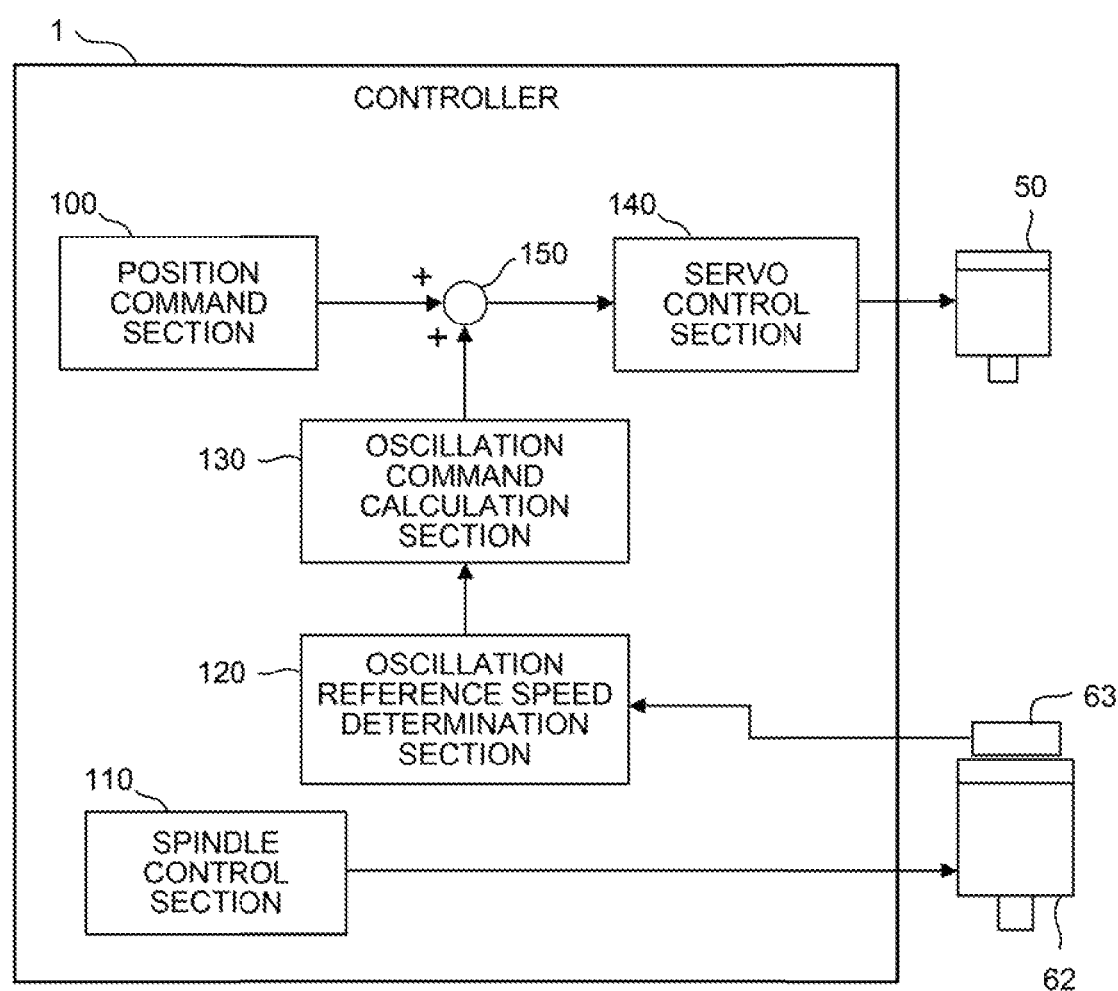
FIG. 2 is a schematic functional block diagram of a controller according to one embodiment.

FIG. 2 is a schematic functional block diagram showing principal portions of a controller according to one embodiment of the present invention for the case where a system program for realizing a rocking motion function of the present invention is implemented in the controller 1 shown in FIG. 1.

Each functional block shown in FIG. 2 is realized by the CPU 11 of the controller 1 shown in FIG. 1 executing a system program for the rocking motion function and controlling the operation of each section of the controller 1. The controller 1 of the present embodiment includes a position command section 100, a spindle control section 110, an oscillation reference speed determination section 120, an oscillation command calculation section 130, and a servo control section 140.

The position command section 100 outputs a command for controlling the position of the servo motor 50 for each control cycle based on a position command read from a machining program that is read from the non-volatile memory 14, a position command commanded by a controller superior to the controller 1, or the like. The position command section 100 may calculate a command (travel distance of the servo motor 50 for each control cycle) for controlling the position of the servo motor 50 for each control cycle based on a position command and output the calculated command.

The spindle control section 110 controls the rotational speed of the spindle motor 62 based on a spindle command read from a machining program read from the non-volatile memory 14, a spindle command commanded by a controller superior to the controller 1, or the like. The spindle control section 110 may control the number of revolutions of the spindle motor 62 for each control cycle based on a spindle command.

The oscillation reference speed determination section 120 determines an oscillation reference speed $F_B$ (maximum speed of an axis to be rocked between the top dead point and the bottom dead point) based on an oscillation-related set value set in an oscillation setting area provided on memory such as the non-volatile memory 14 in advance, a command value to the spindle motor 62, and a value fed back from the spindle motor 62. The oscillation reference speed determination section 120 may calculate the reference speed $F_B$ using a set value $F_p$ for an oscillation-related reference speed which is set in the oscillation setting area, a reference main spindle rotational speed S, which is the rotational speed of the main spindle based on a command relating to the spindle motor, and an actual main spindle rotational speed $S_r$, which is the actual rotational speed of the main spindle fed back from the spindle motor 62, based on the following formula (2).

$$F_B = F_p \times \frac{S_r}{S} \quad (2)$$

The oscillation command calculation section 130 calculates rocking motion speed for each control period (travel distance corresponding to rocking motion for each control period) based on the reference speed $F_B$ determined by the oscillation reference speed determination section 120 and the oscillation-related set value set in the oscillation setting area provided on memory such as the non-volatile memory 14 in advance. The calculation of the rocking motion speed for each control period by the oscillation command calculation section 130 is performed by a calculation method appropriate to an object of high-accuracy oscillation control to which the present invention is applied. A difference from prior art techniques is that the reference speed $F_B$ used in the calculation is a value determined by the oscillation reference speed determination section 120. The rocking motion speed for each control period calculated by the oscillation command calculation section 130 is added by an adder 150 to a command for controlling the position of the servo motor 50 for each control cycle which is outputted from the position command section 100.

The servo control section 140 controls the servo motor 50 based on the output from the adder 150.

In the controller 1 having the above-described configuration, the reference speed $F_B$ of oscillation is changed in accordance with a change in the main spindle rotational speed fed back from the spindle motor 62 when the controller 1 performs high-accuracy oscillation control. Accordingly, the controller 1 can perform more accurate rocking motion according to the rotation of the main spindle, as compared with prior art techniques.

For example, in the case where the present invention is applied to the grinding of a crankshaft such as shown in FIG. 3, a reference speed $F_p$ set as a parameter is used as the reference speed $F_B$ to perform rocking motion control if an actual main spindle rotational speed $S_r$ is equal to a command value, and a value obtained by compensating the reference speed $F_p$ is used as the reference speed $F_B$ to perform rocking motion control if there is a change in the actual main spindle rotational speed $S_r$ due to disturbance or the like.

Figure 4:
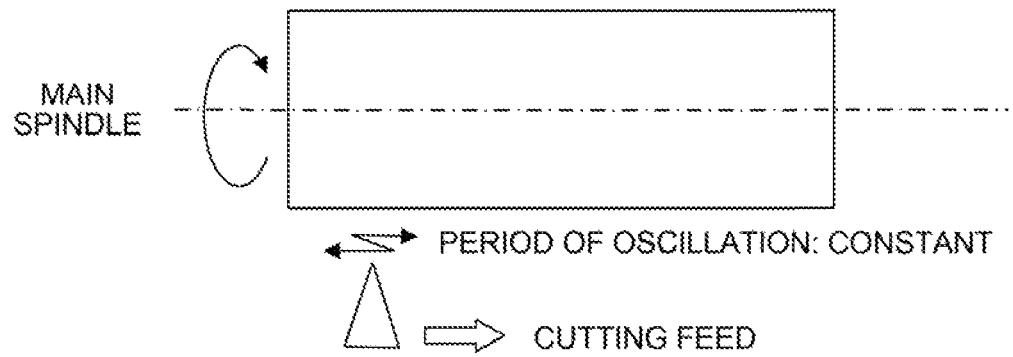
FIG. 4 is a view for explaining subdividing of chips according to a prior art technique.
Figure 5:
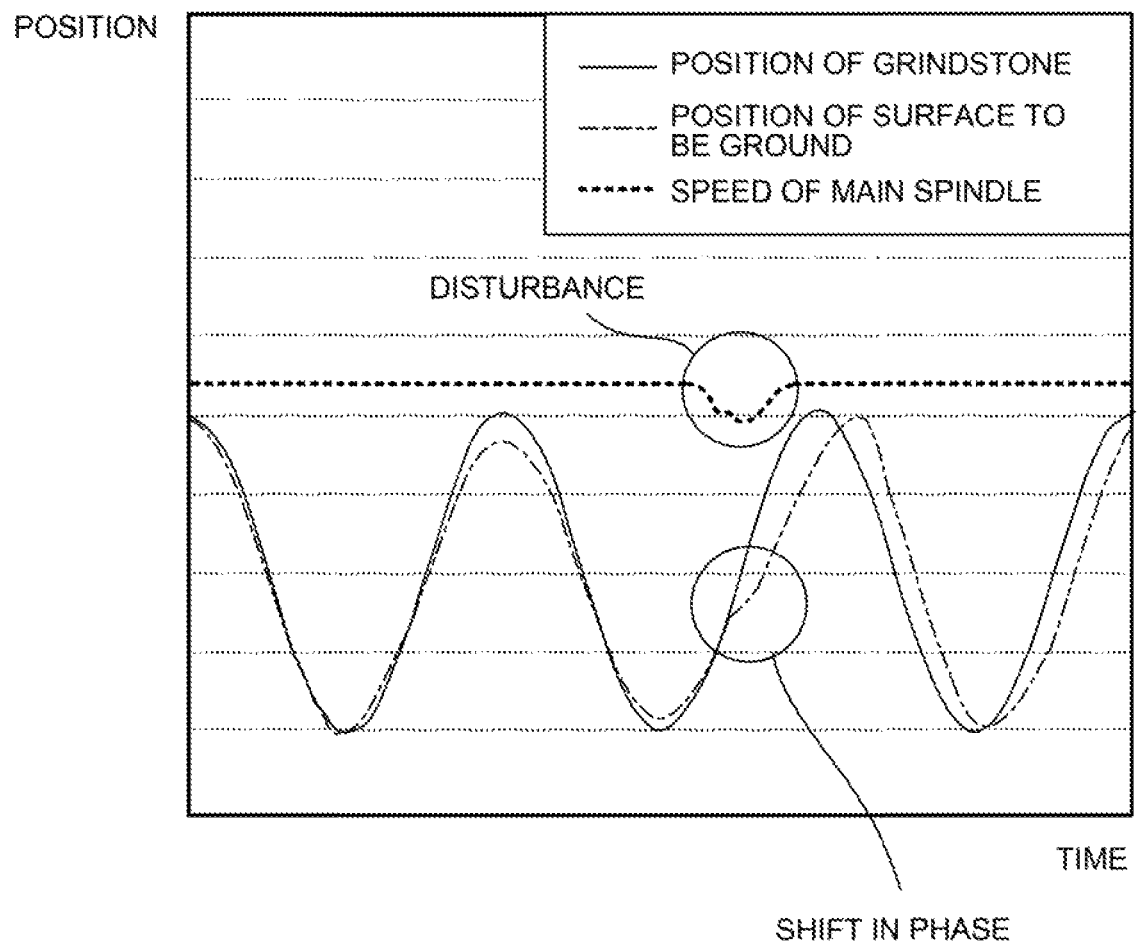
FIG. 5 is a view for explaining a problem of the grinding of a crankshaft according to a prior art technique.

Moreover, in a case where a constant circumferential speed control in which the circumferential speed is kept constant is used when machining a conical workpiece, in subdividing chips by oscillation such as shown in FIGS. 4 and 6, if the actual main spindle rotational speed increases by performing the constant circumferential speed control, then the reference speed $F_B$ of rocking motion also increases accordingly, with result that the period of oscillation can be sequentially changed to a period appropriate to the subdividing of chips, by applying the present invention.

Further, by applying the present invention, it is possible to deal with the case where a worker has changed an override value of the number of revolutions of the main spindle during machining, the case where the rotation of the main spindle has been stopped for any reason, and the like.

While an embodiment of the present invention has been described above, the present invention is not limited to the above-described exemplary embodiment, and can be carried out in various aspects by making appropriate modifications thereto.

For example, though a general controller has been described as an example of the controller 1 in the above-described embodiment, functions of the present invention can also be installed in a smaller-scale servo controller.

The invention claimed is:

1. A controller that performs high-accuracy oscillation control in which an axis driven by a motor is rocked in accordance with rotation of a spindle motor for driving a main spindle, the controller comprising:
    a position command section configured to output a command for controlling a position of the motor for each control period;
    an oscillation reference speed determination section configured to determine a reference speed of the rocking motion based on a reference speed set as a parameter in advance, a reference main spindle rotational speed of the spindle motor, and an actual main spindle rotational speed of the spindle motor fed back from the spindle motor;

an oscillation command calculation section configured to calculate a rocking motion speed for each control period based on a rocking-motion-related set value set in advance and the reference speed of the rocking motion determined by the oscillation reference speed determination section; and an adder configured to add the rocking motion speed for each control period calculated by the oscillation command calculation section to the command outputted by the position command section for controlling position.

* * * * *